(12) United States Patent
Stählin

(10) Patent No.: US 11,866,058 B2
(45) Date of Patent: Jan. 9, 2024

(54) APPARATUS AND METHOD FOR TIME SYNCHRONIZATION IN V2X NETWORKS

(71) Applicant: Continental Automotive Systems, Inc., Auburn Hills, MI (US)

(72) Inventor: Ulrich Stählin, Oakland Township, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 202 days.

(21) Appl. No.: 17/557,323

(22) Filed: Dec. 21, 2021

(65) Prior Publication Data

US 2023/0192108 A1 Jun. 22, 2023

(51) Int. Cl.
| | |
|---|---|
| *B60W 50/06* | (2006.01) |
| *H04W 4/40* | (2018.01) |
| *B60W 10/18* | (2012.01) |
| *B60W 10/20* | (2006.01) |
| *B60W 10/30* | (2006.01) |
| *H04W 56/00* | (2009.01) |

(52) U.S. Cl.
CPC ............ *B60W 50/06* (2013.01); *B60W 10/18* (2013.01); *B60W 10/20* (2013.01); *B60W 10/30* (2013.01); *H04W 4/40* (2018.02); *H04W 56/0045* (2013.01); *B60W 2556/45* (2020.02)

(58) Field of Classification Search
CPC ...... B60W 50/06; B60W 10/18; B60W 10/20; B60W 10/30; B60W 2556/45; H04W 4/40; H04W 56/0045; H04W 56/0025
See application file for complete search history.

(56) References Cited

U.S. PATENT DOCUMENTS

| | | |
|---|---|---|
| 9,300,423 B2 | 3/2016 | Rubin et al. |
| 9,461,762 B2 | 10/2016 | Stählin |
| 10,341,972 B2 | 7/2019 | Park et al. |
| 10,785,079 B2 | 9/2020 | Dezfooliyan et al. |
| 2012/0140861 A1 | 6/2012 | Menon et al. |
| 2019/0306817 A1 | 10/2019 | Abedini et al. |
| 2019/0306917 A1 | 10/2019 | Abedini et al. |
| 2020/0225363 A1 | 7/2020 | Samii et al. |

FOREIGN PATENT DOCUMENTS

| | | |
|---|---|---|
| JP | 2019054387 A | 4/2019 |
| WO | 2019028769 A1 | 2/2019 |

OTHER PUBLICATIONS

Hussein Sherif et al. "VANET clock synchronization for resilient DRSC safety applications" 2017 Resilience Week (RWS), IEEE, Sep. 18, 2017, pp. 57-63.
International Search Report and Written Opinion dated Apr. 5, 2023 from corresponding International patent application No. PCT/US2022/053679.

*Primary Examiner* — Jacob M Amick
*Assistant Examiner* — Charles J Brauch

(57) ABSTRACT

The assumption that every participating vehicle control unit (VCU) or engine control unit (ECU) in a V2X network is synchronized to GNSS time or GPS time (or some other time base) is discarded. An error is assumed for every time entry. For all messages received from a dedicated communication node, a time compensation offset is determined.

20 Claims, 5 Drawing Sheets

APPARATUS AND METHOD FOR TIME SYNCHRONIZATION IN V2X NETWORKS

TECHNICAL FIELD

The technical field relates to vehicle-to-everything (V2X) communications and synchronizing these communications.

BACKGROUND

In vehicle-to-everything (V2X) communications, messages are exchanged between a vehicle and other entities. For example, V2X communications may cover communications between the vehicle and other vehicles, between the vehicle and other humans users, or between the vehicle and various communications networks.

V2X compliant messages (e.g., cooperative awareness messages (CAMs), decentralized environmental notification messages (DENMs), or basic safety messages (BSMs)) need to include well-synchronized time information for accurate scene interpretation to be performed when processing these messages. The global navigation satellite system (GNSS) or Global Positioning System (GPS) are used as the basis for time used in the messages and each V2X unit synchronizes its time to GNSS or GPS time. If this time synchronization is not accurate, other V2X units will not accept the messages from the unit because they assume it is corrupted and/or a scene interpretation is not possible since the information does not fit together with other received messages. In one example, an offset or error of 1 second where the unit is in a vehicle moving at a speed of 30 m/s means a position error of 30 m.

BRIEF DESCRIPTION OF THE DRAWINGS

For a more complete understanding of the disclosure, reference should be made to the following detailed description and accompanying drawings wherein.

Figure 1:
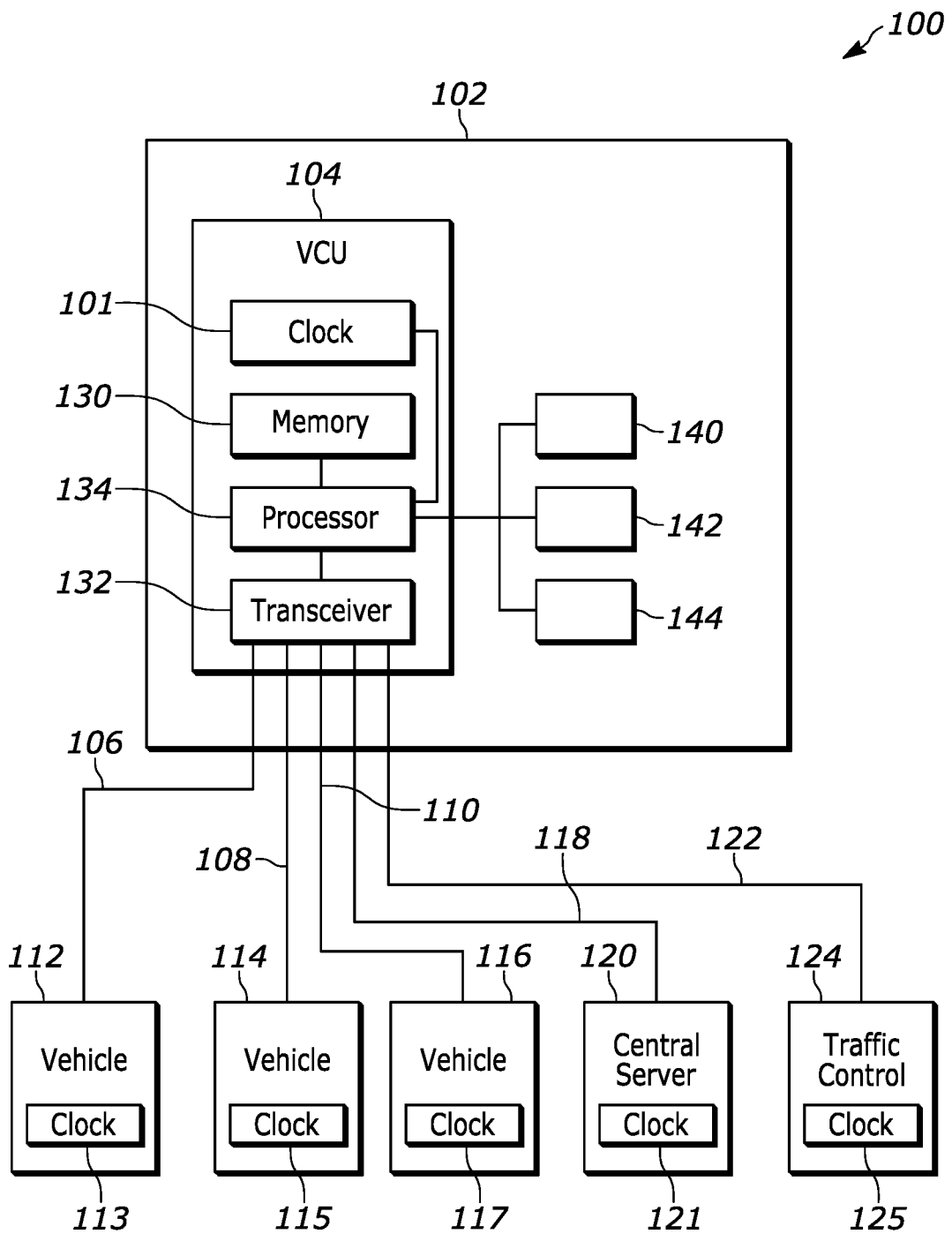
FIG. 1 comprises a diagram of a system according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

In the present approaches, the assumption that every participating vehicle control unit (VCU), engine control unit (ECU), or other device in a V2X network is synchronized to GNSS time or GPS time (or some other time base) is discarded. An error is assumed for every time entry (e.g., time stamps in messages). For all messages received from a dedicated communication node (either detected via the sender identifier or using cryptographic signatures), a time compensation offset is determined for messages received from a sender. This time compensation offset is applied to all messages (e.g., to time stamps in these messages) received from the sender. This time compensation offset represents the systematic difference between the sender's time and the ego time of the receiver and compensates for this difference.

For example, the average difference between the sender's time and the ego time is obtained and used as the offset. The average could be a weighted average where the weight is determined from the ego time synchronization accuracy at the point of time of the reception of the message. In this way, different GNSS or GPS signal receiving conditions can be taken into account, assuming they will influence the ego time synchronization accuracy in a different fashion such as the sender's time synchronization. In another example, the median difference between the sender's time and ego time is obtained and used as an offset.

In many of these embodiments, an approach for determining time compensations in a V2X system includes receiving at a transceiver device of a vehicle a plurality of electronic messages from a plurality of senders. For each sender of the plurality of senders, a time compensation offset is individually determined based upon a difference between timestamps in messages received from each sender and an ego time of the transceiver device. The time compensation offset determined for each sender is applied to each timestamp of each message from each sender to create a modified timestamp for each message from each sender. Each message including each modified timestamp is transmitted to at least one vehicle application of the vehicle and the application processes each message according to each modified timestamp to selectively perform an action.

In aspects, when a difference between a time indicated in a received message and ego time is greater than a threshold, the message is discarded. This threshold may be fixed or dynamic.

In examples, the action comprises adjusting a braking component of the vehicle, adjusting a steering component of the vehicle, adjusting a lighting component of the vehicle, or adjusting an entertainment system component of the vehicle. Other examples of actions are possible.

In other aspects, individually determining a time compensation offset comprises determining an average difference between a senders time and ego time. In still other aspects, individually determining a time compensation offset comprises determining a median difference between a senders time and ego time. Other examples of computing offsets are possible.

In other examples, the ego time of the transceiver is adjusted based upon an analysis of each of the time compensation offsets. In still other examples, a confidence value is determined for each time compensation offset.

In others of these embodiments, a system of determining time compensation in a V2X system comprises a transceiver device deployed at a vehicle and configured to receive a plurality of electronic messages from a plurality of senders; and a processor coupled to the transceiver device. The processor is configured to: for each sender of the plurality of senders, individually determine a time compensation offset based upon a difference between timestamps in messages received from each sender and an ego time of the transceiver device; apply the time compensation offset determined for each sender to each timestamp of each message of each sender to create a modified timestamp for each message from each sender; and transmit each message including each modified timestamp to at least one vehicle application of the vehicle and wherein the application processes each message according to each modified timestamp to selectively perform an action.

In still others of these embodiments, a non-transitory, machine-accessible storage medium has computer instructions and the instructions are configured, when executed on a processor to cause the machine to: receive at a transceiver device of a vehicle a plurality of electronic messages from a plurality of senders. For each sender of the plurality of senders, individually determine a time compensation offset based upon a difference between timestamps in messages received from each sender and an ego time of the transceiver device. The time compensation offset determined for each sender is applied to each timestamp of each message of each sender to create a modified timestamp for each message from each sender. Each message including each modified timestamp is transmitted to at least one vehicle application of the vehicle and wherein the application processes each message according to each modified timestamp to selectively perform an action.

Referring now to FIG. 1, one example of a V2X system with integrity determination is described, The system 100 include a vehicle 102 and a vehicle control unit (VCU) 104. The VCU 104 includes an electronic memory 130, a transceiver device 132, and a processor or control circuit 134. The vehicle 102 also includes a clock 101. The clock 101 maintains an ego time for the vehicle. It will be appreciated that as used herein "ego time" refers to the time of a vehicle 102.

The clock 101 may be any type of clock that uses any digital, analog, or quartz technology in keeping time to mention a few examples. The vehicle 102 may be any type of vehicle such as a passenger car, truck, airplane, ship, automated ground vehicle, or drone to mention a few examples. Other examples are possible.

The vehicle 102 may have systems or subsystems 140, 142, and 144 that couple to the processor 134. The systems or subsystems 140, 142, and 144 may include the engine system, the braking system, the tire system, and the entertainment systems to mention a few examples. Messages received are used to control these systems. For example, the messages may set parameters that alter or control the operation of these components. In another example, the messages directly control the operation of these components. For example, brakes may be applied or the steering of the vehicle 102 changed.

The electronic memory 130 is any type of electronic memory device. For example, the electronic memory 130 may be or can include any one or combination of volatile memory elements (e.g., random access memory (RAM), such as dynamic RAM (DRAM), static RAM (SRAM), synchronous dynamic RAM (SDRAM), video RAM (VRAM), and so forth) and/or nonvolatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The transceiver device 132 is configured to transmit and/or receive electronic messages to and/or from senders over communication channels 106, 108, and 110. In this case, the communication channels 106, 108, and 110 communicate with other vehicles 112, 114, and 116. Another communication channel 118 communicate with a central server 120. Still another communication channel 122 communicates with a traffic control device 124. The traffic control device 124 may be, in examples, a traffic light. The transceiver device 132 may be any combination of hardware or software that enables the transmission of reception of electronic messages including formatting, decoding, and encoding functions. Other examples of functions are possible.

Each of the vehicles 112, 114 and 116 has a clock 113, 115, and 117 respectively. The traffic control device 124 also has a clock 125. The central server 120 has a clock 121. The clocks 1113, 115, 117, 121 and 125 may be any type of clock that use any digital, analog, or quartz technology to mention a few examples.

It will be appreciated that as used herein the term "processor" or "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The processor 134 may be configured (for example, by using corresponding programming stored in a memory as will be well understood by those skilled in the art) to carry out one or more of the steps, actions, and/or functions described herein. The processor 134 may include a memory that includes computer instructions that implement any of the functions described herein.

For each sender of the plurality of senders, the processor 134 is configured to individually determine a time compensation for offset for each sender based upon a difference between timestamps in messages received from each sender and an ego time of the vehicle 102 as indicated by the clock 101. This ego time is also the time associated with all devices in the vehicle 102 including the transceiver device 132 and the processor 134. The processor 134 is further configured to apply the time compensation offset determined for each sender to each timestamp of each message of each sender to create a modified timestamp for each message from each sender. The processor 134 is still further configured to transmit each message including each modified timestamp to at least one vehicle application of the vehicle 102. The application may reside at one of the subsystems 140, 142, and 144. The application processes each message according to each modified timestamp to selectively perform an action. In examples, the action comprises adjusting a braking component of the vehicle, adjusting a steering component of the vehicle, adjusting a lighting component of the vehicle, or adjusting an entertainment system component of the vehicle. Other examples of actions are possible.

In aspects, when a difference between a time indicated in a received message and ego time is greater than a threshold, the message is discarded by the processor 134. In other aspects, individually determining a time compensation offset comprises determining an average difference between a senders time and ego time of the clock 101. In still other aspects, individually determining a time compensation offset comprises determining a median difference between a senders time and ego time of the clock 101. In still other examples, a Taylor series (nth order polynomial) is used to fit or represent the difference between the sender's time and the ego time. In yet another example, a model-based tracker is used to obtain the time offset assuming typical time synchronization algorithms such as those associated with the network time protocol (NTP) or precision time protocol (PTP).

In yet other examples, the ego time of the transceiver device 132 (as indicated by the clock 101) is adjusted by the processor 134 based upon an analysis of each of the time compensation offsets. In still other examples, a confidence value is determined by the processor 134 for each time compensation offset.

In still other aspects, the processor 134 determines if a new message received from a sender has a difference between the time indicated by time stamp and the ego time indicated by the clock 101 that is larger than a security threshold. If this condition exists, the message is discarded by the processor 134, but the time difference is still used to determine the time compensation offset. After a predefined number of messages are received (e.g., 3, 10, or 20 to mention a few examples) from the same sender, the time stamps of the messages are offset-compensated (and time compensation offset is computed and applied to the time stamps of incoming messages from the sender) by the processor 134 before the security check is performed. In this way, systematic offsets should not result in the processor 134 discarding messages, but only other errors from other sources.

In order to maintain the security process in place, if the time offset for a sender is greater than a threshold, the messages from the sender will be discarded by the processor 134. This approach will prevent replay attacks from getting through to devices at the vehicle 102 since the offset obtained from messages of such attacks will be large. If the time-synchronization accuracy of the ego time of the vehicle 102 is known, this could be used to dynamically change the threshold.

In yet other aspects, the offset calculations produce or can be used to obtain some statistical values such as confidence values and variances. In this way, only those offsets can be compensated or accepted at message reception where the offset value reaches some level of reliability as indicated by the statistical values. For example, if the variance of the offset (e.g., from an average or from other senders) is too large (e.g., larger than a predetermined threshold) the messages from a particular sender may be discarded by the processor 134 or the offset might not be used for the compensation. This can also be used instead of a fixed message count for applying the compensation.

In yet other aspects, the offsets could be used by the processor 134 for scene interpretation (e.g., whether a collision is imminent) to reduce the resulting positioning error. The security check would still be performed based on the uncompensated time information.

In order to improve ego time synchronization, the different offsets determined for different senders in the vicinity of the vehicle 102 are determined by the processor 134. If all of the offsets are of the same range of values (e.g., all indicate around a 5 second offset or difference between the ego time and the time of the senders), then the determination can be made that the ego time of the clock 101 is incorrect and the time at the senders is correct.

In this case, ego time adjustment may occur. In one example the average offset for all senders is obtained by the processor 134 and used to compensate the ego time by adjusting the clock 101. The average might be a weighted average with the weights being used being derived from the position distance between the sender and the vehicle 102 (shorter distances having greater weights than larger distances). In another example, the median offset is obtained and used to compensate the ego time. Weighting can also be used to weight the different values used in the median valuation with offsets from closer vehicles weighted more heavily as compared to offsets from vehicles further away.

These approaches also avoid changing the ego time too quickly (which could result in large jumps in ego time of the clock 101). In some aspects, if the compensation amount to be applied to the clock 101 to adjust the ego time is small enough (e.g., less than a predetermined threshold), smoothing could be used to gradually adjust the ego time over a time period rather than adjusting the clock 101 with the entire compensation at a single point in time.

In another approach, the compensation is used as input to another time synchronization algorithm. Still another approach would be to assume that stationary units in the vicinity of the vehicle 102 (the reception area of the vehicle 102) have better time than those of moving units (e.g., from vehicles). Ego time adjustment of the clock 101 can therefore only use offsets from these stationary units and not from moving units.

Figure 2:
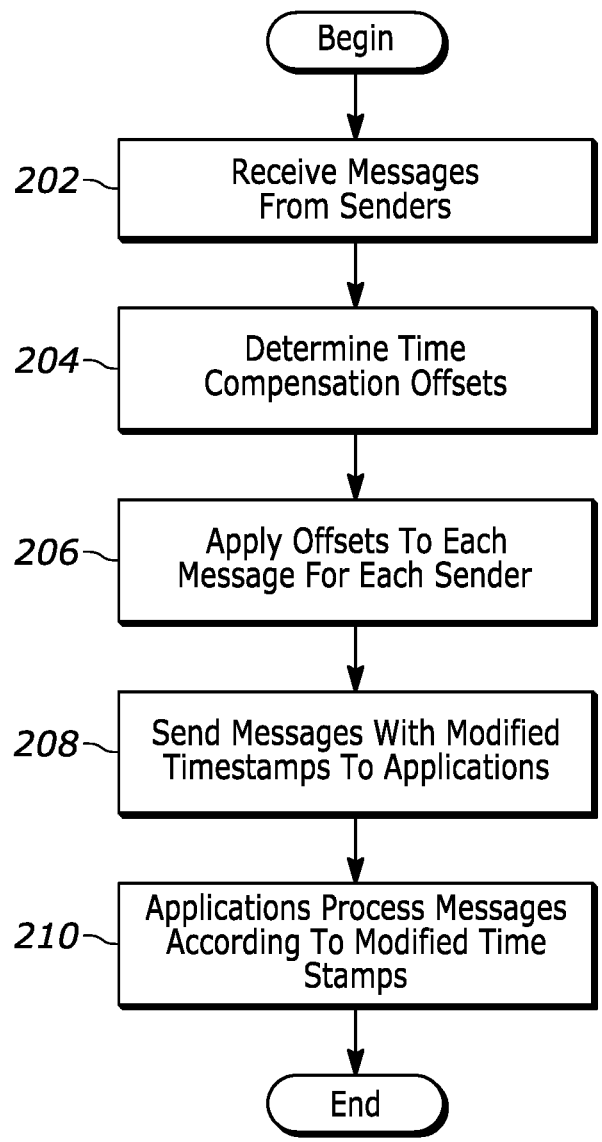
FIG. 2 comprises a flowchart of an approach according to various embodiments of the present invention.

Referring now to FIG. 2, one example of obtaining time synchronization in messages in a V2X network is described. At step 202, a transceiver device of a vehicle receives a plurality of electronic messages from a plurality of senders. In aspects, the messages include time stamps that represent the time of the sender when the message was sent, were processed by the sender, or are in some other relationship to the sender's time.

At step 204 and for each sender of the plurality of senders, a time compensation offset is individually determined based upon a difference between timestamps in messages received from each sender and an ego time of the transceiver. As described elsewhere herein, a different and unique time compensation offset is computed for each sender.

At step 206, the time compensation offset determined for each sender is applied to each timestamp of each message of each sender to create a modified timestamp for each message from each sender. In these regards, each message may have a field that is the timestamp and this field may be adjusted.

At step 208, each message including each modified timestamp is transmitted to at least one vehicle application of the vehicle. The application may relate to various vehicular systems such as the braking system, the steering system, the engine, the lighting system or the entertainment system to mention a few examples.

At step 210, the application processes each message according to each modified timestamp to selectively perform an action. Processing may include scene interpretation. In one example, scene interpretation may include analyzing the messages to determine the environment of the vehicle (e.g., the position, speed, and movement of other vehicles in the vicinity of the vehicle), integration of these movements, and/or predictions (e.g., based on the positions, speeds, and movements of the other vehicles, whether vehicle-to-vehicle collisions are likely or predicted to occur). The actions can be used to adjust the system in reaction to the processing (e.g., adjust the steering and/or apply the brakes of the vehicle if a collision is determined to be imminent to avoid the collision).

It will be appreciated that the offset can be computed for each sender for each message received from the sender. In other examples, the time compensation is computed only once and applied subsequently to all other messages received. In still other examples, the time compensation offset is periodically recalculated for each sender (after every n messages where n is an integer or after a predetermined time interval).

Figure 3:
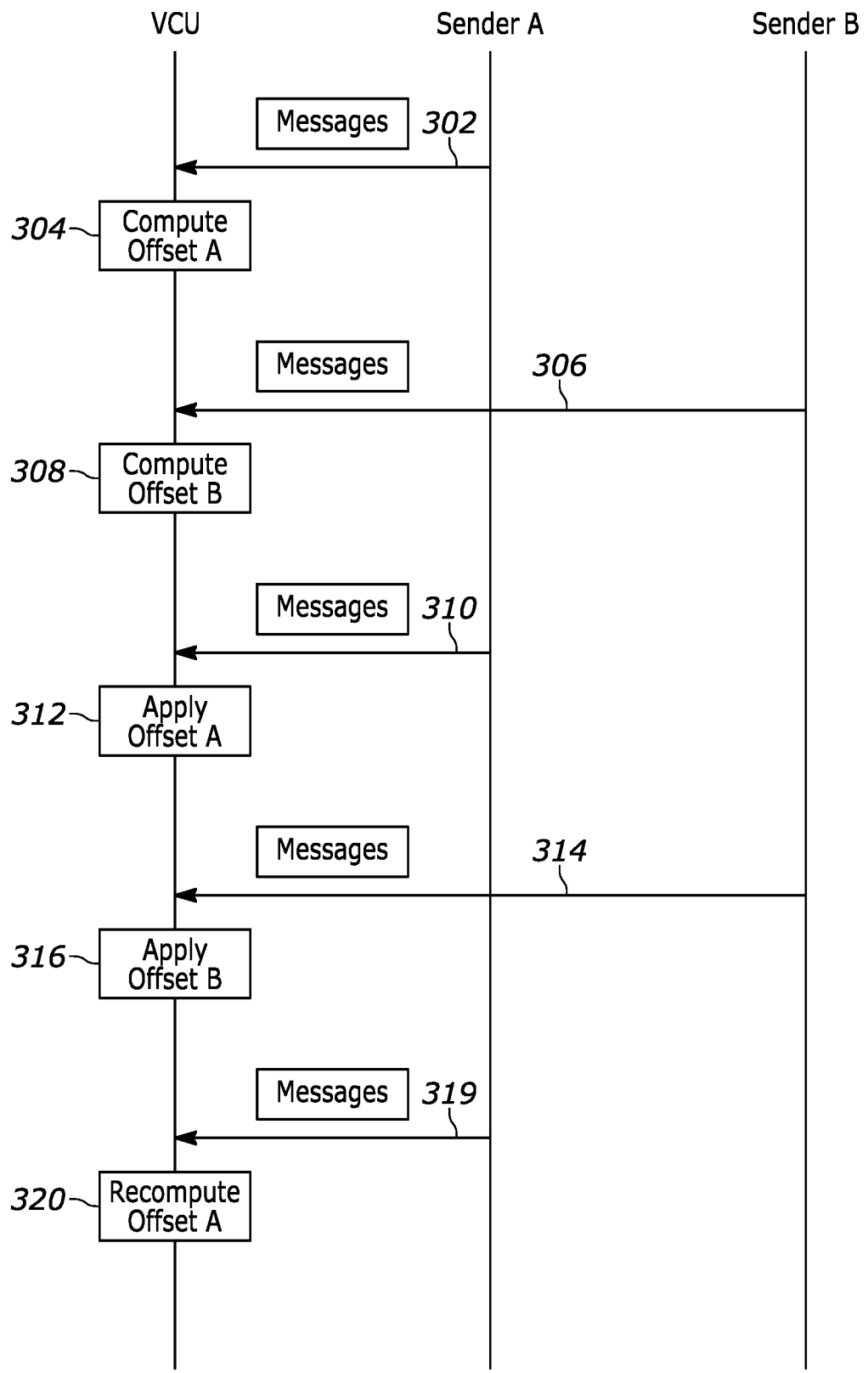
FIG. 3 comprises a flowchart according to various embodiments of the present invention.

Referring now to FIG. 3, one example of an approach for determining time compensation offsets is described.

At step 302, V2X messages from sender A are received. A time compensation offset A is determined at step 304. The offset can be applied to these messages and the messages received from sender A (including the message just received) with the modified timestamp utilized by applications at the VCU.

At step 306, V2X messages are received from sender B. A time compensation offset B is computed at step 308. The time compensation offset B is different from compensation offset A. The offset B can be applied to these messages received from sender B (including the current message) and the messages with the modified timestamp utilized by applications at the VCU.

At step 310, further V2X messages from sender A are received. At step 312, the previously computed time compensation offset A is applied. In other examples, the time compensation offset A is recomputed (i.e., recomputing the time compensation offset occurs every time a message is received making the offset determination both sender and message dependent. Recomputation can be based on any number of already received messages from sender A or just the new message). The offset is applied to these messages and the messages with the modified timestamp utilized by applications at the VCU.

At step 314, another group of messages is received from sender B. At step 316, the previously computed offset is applied to these messages. In other examples, the time compensation offset B is recomputed (i.e., recomputing the time compensation offset occurs every time a message is received making the offset determination both sender and message dependent. Recomputation can be based on any number of already received messages from sender B or just the new message). The offset B is applied to these messages and the messages with the modified timestamp utilized by applications at the VCU.

In this example, the time compensation offsets are periodically determined, refined, or re-computed as groups of new messages from particular senders are received. For example, the first n messages received are obtained a time compensation offset determined, and then another n messages from the sender are received and the offset is recomputed.

In another example, after a predetermined period of time, the offset for a sender is redetermined regardless of the number of messages received. For example, after every ten seconds, the offset can be recomputed. Alternatively, the offsets may remain unchanged after their initial determination.

At step 318, messages from sender A are received. At step 320, offset A is redetermined. The offset is applied to these messages and the messages with the modified timestamp utilized by applications at the VCU. Step 318 can be omitted if the offsets are recomputed with every message.

Figure 4:
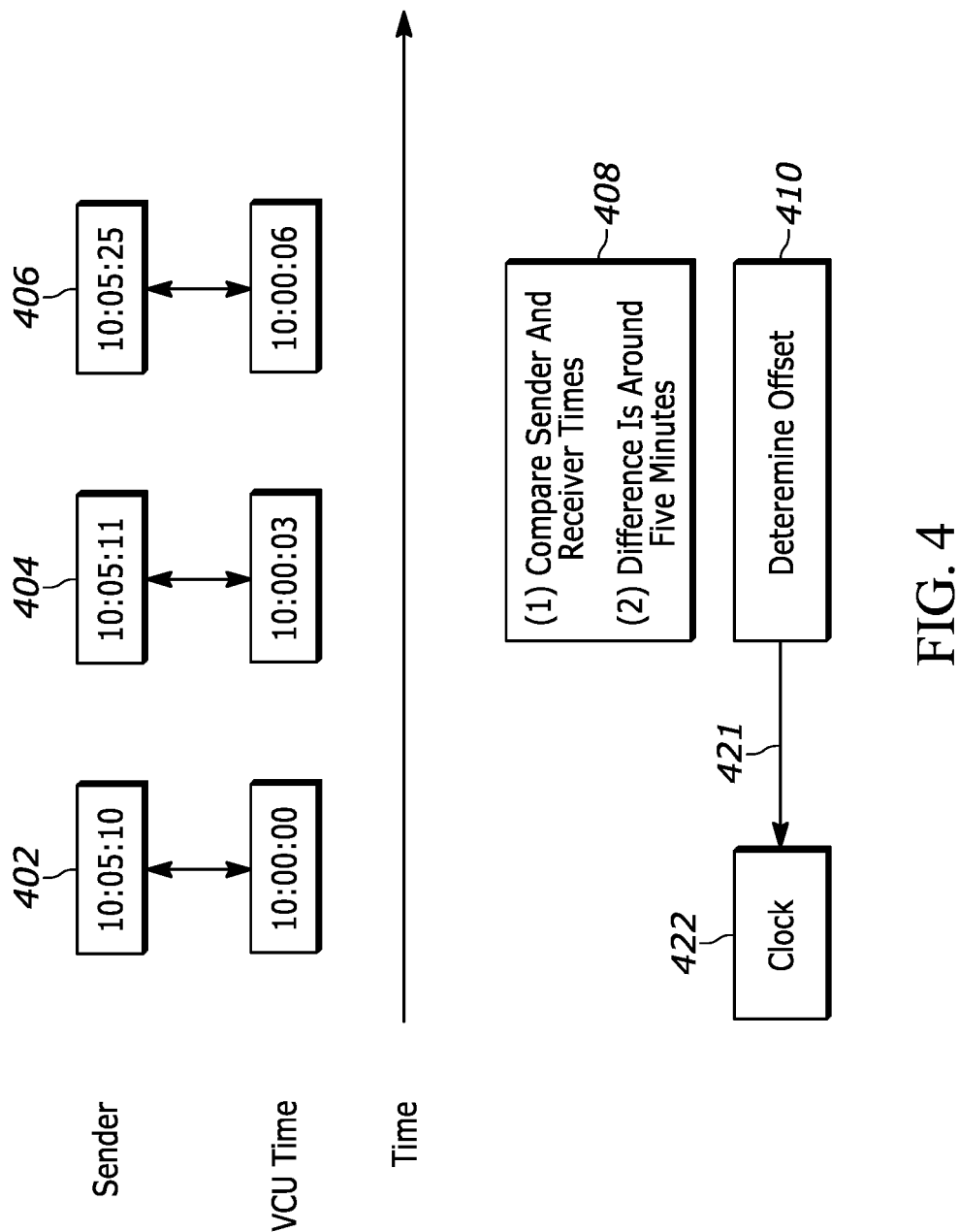
FIG. 4 comprises a flowchart according to various embodiments of the present invention.

Referring now to FIG. 4, one example of an approach for changing the ego time of a receiver is described. A VCU includes a clock 422 and the clock 422 maintains, creates, and/or utilizes an ego time by which the VCU (and possibly other systems of the vehicle) operates.

In this example, the VCU analyzes the time stamps of messages for consistency and compares these to the ego time to determine whether the ego time setting is clearly incorrect. For example, the VCU may determine that there is around a 5 minute time difference between the ego time and all time stamps of messages from other vehicles. This can mean that the ego time of clock 422 is wrong and the times in the time stamps are correct causing a correction value of five minutes to be applied to the clock 422.

A first message 402 arrives and has time stamp 10:05:10. After 3 seconds, a second message 404 is received and has a timestamp of 10:05:11. After 3 more seconds, a third message 406 is received and has a timestamp of 10:05:25. The ego time of the receiver at these the time is 10:00:00, 10:00:03 and 10:00:06 respectively.

At step 408 comparisons are made between the time shown in the timestamp of the messages and the ego time at the time the message was received. In this case, the comparison shows a difference of around five minutes.

At step 410 a determination is made as to the offset. In this case, it can be seen that the difference between offset and ego time is around five minutes so that around a five minute offset looks reasonable and the offset is applied to the clock at step 421. The times in the example are just for easy reference. Smaller or bigger time differences can be seen in implementations.

In examples, a confidence for the time stamps/offsets of others may be determined and this used to set the ego time. For example, if all timestamps from senders are within +/−one minute of each other, they are likely indicating a correct or good time. An average time or average offset for these times can be determined and used to settle clock 422 to this new ego time.

The approach is advantageous because it helps other vehicles in their computations and predictions since the clock 422 has more accurate time and this more accurate time is applied to time stamps sent by the VCU to their vehicles. Since these time stamps help others, this may indirectly help the VCU as the other vehicles send messages back to VCU based upon a time that is now more accurate.

Figure 5:
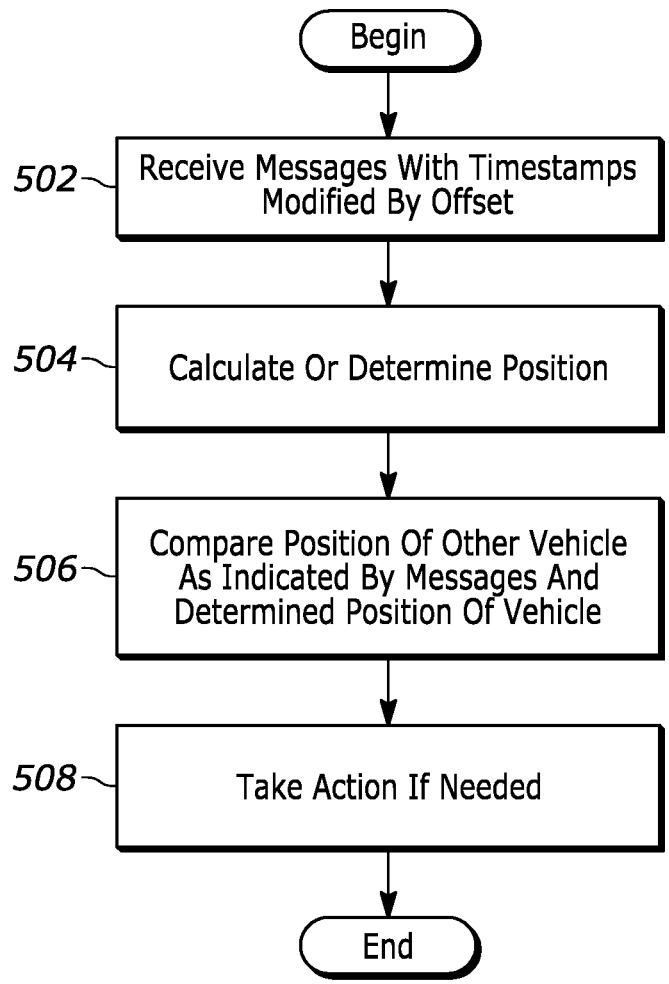
FIG. 5 comprises a flowchart according to various embodiments of the present invention.

Referring now to FIG. 5, an example of using messages with time compensation offsets used to make predictions is described.

At step 502, a message with a time compensation offset applied to the time stamp is received. The message is from another vehicle and indicates the position of the vehicle and the time the message was sent (e.g., in a time stamp).

At step 504, a position is calculated or determined for the other vehicle using the message. For example, using the position indicated in the message and the time indicated in the message, the current position of the other vehicle can be determined.

At step 506, a determination is made as to whether a collision with the other vehicle is imminent. This can be determined by taking the current position of the other vehicle as indicated by the messages from the sender and the current position of the vehicle (e.g., indicated by a GNSS or GPS system) and comparing these two positions and whether the positions are on the same path.

At step 508, an action is taken if needed. For example, an alert can be issued to the driver of the vehicle, the braking system often vehicle of the vehicle can be activated, or the steering of the vehicle adjusted to mention a few examples. The determination of whether a collision is imminent will be a correct or good decision because the time stamp received in the message from the other vehicle is accurate.

It should be understood that any of the devices described herein (e.g., the control circuits, the controllers, the receivers, the transmitters, the sensors, any presentation or display devices, or the external devices) may use a computing device to implement various functionality and operation of these devices. In terms of hardware architecture, such a computing device can include but is not limited to a processor, a memory, and one or more input and/or output (I/O)

device interface(s) that are communicatively coupled via a local interface. The local interface can include, for example but not limited to, one or more buses and/or other wired or wireless connections. The processor may be a hardware device for executing software, particularly software stored in memory. The processor can be a custom made or commercially available processor, a central processing unit (CPU), an auxiliary processor among several processors associated with the computing device, a semiconductor based microprocessor (in the form of a microchip or chip set) or generally any device for executing software instructions.

The memory devices described herein can include any one or combination of volatile memory elements (e.g., random access memory (RAM), such as dynamic RAM (DRAM), static RAM (SRAM), synchronous dynamic RAM (SDRAM), video RAM (VRAM), and so forth) and/or nonvolatile memory elements (e.g., read only memory (ROM), hard drive, tape, CD-ROM, and so forth). Moreover, the memory may incorporate electronic, magnetic, optical, and/or other types of storage media. The memory can also have a distributed architecture, where various components are situated remotely from one another, but can be accessed by the processor.

The software in any of the memory devices described herein may include one or more separate programs, each of which includes an ordered listing of executable instructions for implementing the functions described herein. When constructed as a source program, the program is translated via a compiler, assembler, interpreter, or the like, which may or may not be included within the memory.

It will be appreciated that any of the approaches described herein can be implemented at least in part as computer instructions stored on a computer media (e.g., a computer memory as described above) and these instructions can be executed on a processing device such as a microprocessor. However, these approaches can be implemented as any combination of electronic hardware and/or software.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A method of determining time compensation in a V2X system, the method comprising:
   receiving at a transceiver device of a vehicle a plurality of electronic messages from a plurality of senders;
   for each sender of the plurality of senders, individually determining a time compensation offset based upon a difference between timestamps in messages received from each sender and an ego time of the transceiver device;
   applying the time compensation offset determined for each sender to each timestamp of each message of each sender to create a modified timestamp for each message from each sender;
   transmitting each message including each modified timestamp to at least one vehicle application of the vehicle and wherein the application processes each message according to each modified timestamp to selectively perform an action.

2. The method of claim 1, further comprising, when a difference between a time indicated in a received message and ego time is greater than a threshold, discarding the message.

3. The method of claim 1, wherein the action comprises adjusting a braking component of the vehicle, adjusting a steering component of the vehicle, adjusting a lighting component of the vehicle, or adjusting an entertainment system component of the vehicle.

4. The method of claim 1, wherein individually determining a time compensation offset comprises determining an average difference between a senders time and ego time.

5. The method of claim 1, wherein individually determining a time compensation offset comprises determining a median difference between a senders time and ego time.

6. The method of claim 1, further comprising adjusting the ego time of the transceiver based upon an analysis of each of the time compensation offsets.

7. The method of claim 1, further comprising determining a confidence value for each time compensation offset.

8. A system of determining time compensation in a V2X system, the system comprising:
   a transceiver device deployed at a vehicle and configured to receive a plurality of electronic messages from a plurality of senders;
   a processor coupled to the transceiver device, the processor configured to:
   for each sender of the plurality of senders, individually determine a time compensation offset based upon a difference between timestamps in messages received from each sender and an ego time of the transceiver device;
   apply the time compensation offset determined for each sender to each timestamp of each message of each sender to create a modified timestamp for each message from each sender;
   transmit each message including each modified timestamp to at least one vehicle application of the vehicle and wherein the application processes each message according to each modified timestamp to selectively perform an action.

9. The system of claim 8, wherein the processor is further confirmed to, when a difference between a time indicated in a received message and ego time is greater than a threshold, discard the message.

10. The system of claim 8, wherein the action comprises adjusting a braking component of the vehicle, adjusting a steering component of the vehicle, adjusting a lighting component of the vehicle, or adjusting an entertainment system component of the vehicle.

11. The system of claim 8, wherein the processor individually determines a time compensation offset by determining an average difference between a senders time and ego time.

12. The system of claim 8, wherein the processor individually determines a time compensation offset by determining a median difference between a senders time and ego time.

13. The system of claim 8, wherein the processor further adjusts the ego time of the transceiver based upon an analysis of each of the time compensation offsets.

14. The system of claim 8, wherein the processor further determines a confidence value for each time compensation offset.

15. A non-transitory, machine-accessible storage medium having computer instructions and wherein the instructions are configured, when executed on a processor to cause the machine to:
- receive at a transceiver device of a vehicle a plurality of electronic messages from a plurality of senders;
- for each sender of the plurality of senders, individually determine a time compensation offset based upon a difference between timestamps in messages received from each sender and an ego time of the transceiver device;
- apply the time compensation offset determined for each sender to each timestamp of each message of each sender to create a modified timestamp for each message from each sender;
- transmit each message including each modified timestamp to at least one vehicle application of the vehicle and wherein the application processes each message according to each modified timestamp to selectively perform an action.

16. The medium of claim 15, further comprising, when a difference between a time indicated in a received message and ego time is greater than a threshold, discarding the message.

17. The medium of claim 15, wherein the action comprises adjusting a braking component of the vehicle, adjusting a steering component of the vehicle, adjusting a lighting component of the vehicle, or adjusting an entertainment system component of the vehicle.

18. The medium of claim 15, wherein individually determining a time compensation offset comprises determining an average difference between a senders time and ego time.

19. The medium of claim 15, wherein individually determining a time compensation offset comprises determining a median difference between a senders time and ego time.

20. The medium of claim 15, further comprising adjusting the ego time of the transceiver based upon an analysis of each of the time compensation offsets.

* * * * *